(12) United States Patent
Wu et al.

(10) Patent No.: US 11,336,480 B2
(45) Date of Patent: May 17, 2022

(54) CONTROL METHOD AND DEVICE FOR EQUIPMENT AND REFRIGERATOR

(71) Applicants: Qingdao Haigao Design & Manufacturing Co., Ltd., Shandong (CN); Haier Smart Home Co., Ltd., Shandong (CN)

(72) Inventors: Jian Wu, Shandong (CN); Shu Zhou, Shandong (CN); Zhiqun Feng, Shandong (CN); Zhaojun Fei, Shandong (CN); Zuowei Yi, Shandong (CN)

(73) Assignees: QINGDAO HAIGAO DESIGN & MANUFACTURING CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 0 days.

(21) Appl. No.: 17/323,230

(22) Filed: May 18, 2021

(65) Prior Publication Data
US 2021/0297281 A1 Sep. 23, 2021

Related U.S. Application Data

(63) Continuation of application No. PCT/CN2020/126872, filed on Nov. 5, 2020.

(30) Foreign Application Priority Data

Dec. 31, 2019 (CN) .......................... 201911407762.2

(51) Int. Cl.
*H04L 12/28* (2006.01)
*H04B 17/27* (2015.01)
(Continued)

(52) U.S. Cl.
CPC ......... *H04L 12/2838* (2013.01); *H04B 17/27* (2015.01); *H04B 17/318* (2015.01);
(Continued)

(58) Field of Classification Search
CPC ............... H04L 12/2838; H04L 12/283; H04L 12/2823; H04L 2012/285; H04B 17/318; H04B 17/27; H04W 4/023; H04W 4/80
See application file for complete search history.

(56) References Cited

U.S. PATENT DOCUMENTS

2016/0212579 A1* 7/2016 Duan .................. G01S 5/02
2018/0074161 A1* 3/2018 Rosenbaum ........... G01S 5/14
(Continued)

FOREIGN PATENT DOCUMENTS

CN  104080163   10/2014
CN  106485334   3/2017
(Continued)

OTHER PUBLICATIONS

International Search Report from PCT/CN2020/126872 dated Jan. 27, 2021.

*Primary Examiner* — Lakeram Jangbahadur
(74) *Attorney, Agent, or Firm* — Calfee, Halter & Griswold LLP

(57) ABSTRACT

The present application belongs to the technical field of smart appliances, and relates to a control method for equipment, comprising the steps of: acquiring a user instruction and a target position; acquiring the number of connected terminals of each locator beacon, determining target equipment according to the number of connected terminals of the locator beacon, and controlling the target equipment to move to the target position; acquiring position information of the target equipment, and calculating a distance between the target equipment and the target position according to the
(Continued)

target position and the position information of the target equipment; and controlling the target equipment to stop moving when the distance between the target equipment and the target position is less than or equal to a set threshold.

20 Claims, 2 Drawing Sheets

(51) Int. Cl.
  *H04B 17/318* (2015.01)
  *H04W 4/80* (2018.01)
  *H04W 4/02* (2018.01)
(52) U.S. Cl.
  CPC ........ *H04L 12/283* (2013.01); *H04L 12/2823* (2013.01); *H04W 4/023* (2013.01); *H04W 4/80* (2018.02); *H04L 2012/285* (2013.01)

(56) References Cited

U.S. PATENT DOCUMENTS

| | | | | |
|---|---|---|---|---|
| 2018/0187949 A1* | 7/2018 | Wu | ........................ | F25D 23/025 |
| 2018/0195791 A1* | 7/2018 | Wu | ............................ | E05D 3/14 |
| 2018/0246513 A1* | 8/2018 | Cronin | .................. | G05D 1/0282 |
| 2020/0166932 A1* | 5/2020 | Chen | .................... | G05D 1/0088 |

FOREIGN PATENT DOCUMENTS

| | | |
|---|---|---|
| CN | 108198024 | 6/2018 |
| CN | 108989984 | 12/2018 |
| CN | 107463136 | 5/2019 |

* cited by examiner

CONTROL METHOD AND DEVICE FOR EQUIPMENT AND REFRIGERATOR

CROSS-REFERENCE TO RELATED APPLICATIONS

The present application is a bypass continuation of PCT Application No. PCT/CN2020/126872, filed on Nov. 5, 2020, which claims priority to Chinese Patent Application No. 201911407762.2 with a filing date of Dec. 31, 2019. The entire contents thereof are incorporated into the present application herein by reference.

TECHNICAL FIELD

The present application relates to the technical field of smart appliances, for example, relates to a control method and device for equipment and a refrigerator.

BACKGROUND

At present, with the increasingly widespread use of smart appliances, people have increasingly intelligent requirements on the functions of smart appliances. Especially in large-scale scenes such as exhibition halls, the situation that a refrigerator or waiter cannot be found when people want to have cold drinks often appears, thereby causing relatively poor customer experience.

During implementation of embodiments of the present disclosure, it is found that at least the following problems exist in the related art: the control for dispatching refrigerators is absent at present; and for a scene with multiple refrigerators, it is impossible to select the most preferred refrigerator for dispatching and also impossible to dispatch the multiple refrigerators simultaneously.

SUMMARY

To basically understand some aspects of the disclosed embodiments, a brief summary is given below. The summary is not a general comment, nor an intention to determine key/important elements or describe the protection scope of the embodiments, but serves as a preface to the following detailed description.

Embodiments of the present disclosure provide a control method and device for equipment and a refrigerator, to solve the problem that the dispatching for delivery of multiple home appliances is absent at present.

In some embodiments, the control method for equipment comprises the steps of:

acquiring a user instruction and a target position;

acquiring the number of connected terminals of each locator beacon, determining target equipment according to the number of connected terminals of the locator beacon, and controlling the target equipment to move to the target position;

acquiring position information of the target equipment, and calculating a distance between the target equipment and the target position according to the target position and the position information of the target equipment; and controlling the target equipment to stop moving when the distance between the target equipment and the target position is less than or equal to a set threshold.

In some embodiments, the control device for equipment comprises a processor and a memory storing program instructions; and the processor is configured to execute the above control method for equipment when executing the program instructions.

In some embodiments, the equipment comprises the above control device for equipment.

The control method and device for equipment and the refrigerator provided by the embodiments of the present disclosure can achieve the following technical effects: the target equipment can be determined according to the number of connected terminals of the locator beacon and controlled to move to the target position, thereby realizing the dispatching of home appliances, simultaneously meeting the requirement of dispatching multiple home appliances in large-scale scenes such as exhibition halls, making the dispatching of home appliances smarter, and bringing more comfortable experience to users.

The above general description and the following description are merely exemplary and explanatory, and not used to limit the present application.

BRIEF DESCRIPTION OF THE DRAWINGS

One or more embodiments are exemplified by the corresponding accompanying drawings; and the exemplified descriptions and the accompanying drawings do not constitute a limitation to the embodiments. Components with the same reference numerals in the drawings are shown as similar components; and the accompanying drawings do not constitute a proportion limitation. In the figures.

DETAILED DESCRIPTION

To understand characteristics and technical contents of embodiments of the present disclosure in more detail, the implementation of the embodiments of the present disclosure will be described in detail with reference to the accompanying drawings. The accompanying drawings are for reference only, and are not used to limit the embodiments of the present disclosure. In the following technical descriptions, for convenience of explanation, multiple details are used to provide a sufficient understanding of the disclosed embodiments. However, one or more embodiments can still be implemented without these details. In other cases, the display of well-known structures and devices can be simplified, to simplify the accompany drawings.

Figure 1:
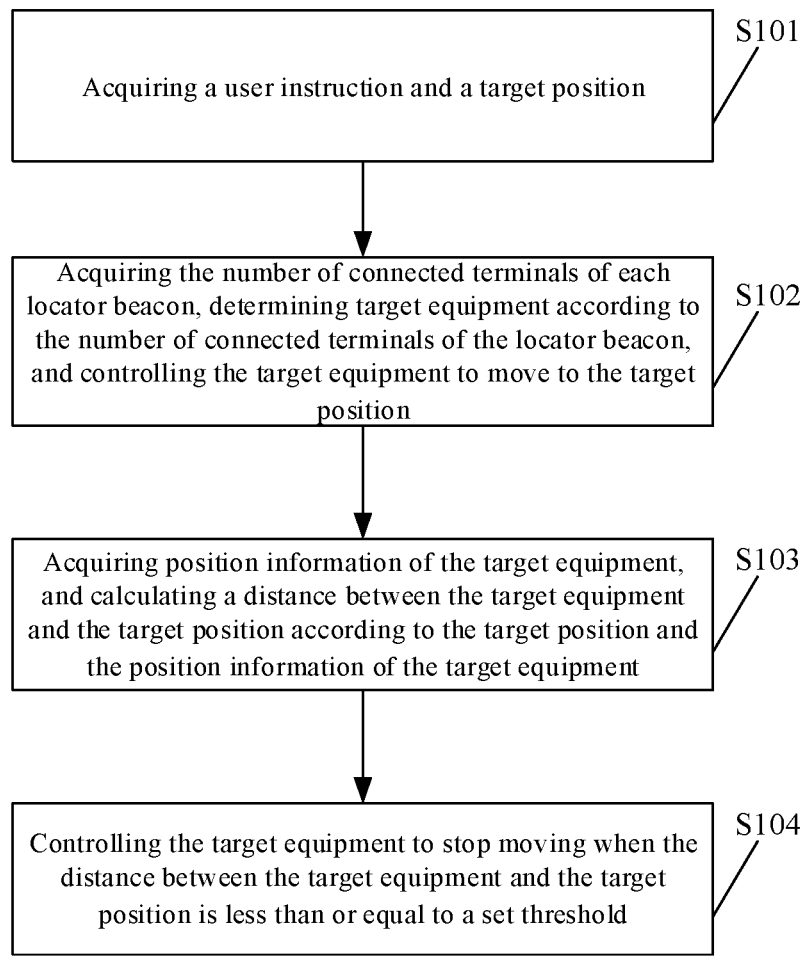
FIG. 1 is a flowchart of a control method for equipment provided by embodiments of the present disclosure.

The embodiments of the present disclosure provide a control method for equipment, as shown in FIG. 1, comprising the steps of:

S101. acquiring a user instruction and a target position;

S102. acquiring the number of connected terminals of each locator beacon, determining the target equipment according to the number of connected terminals of the locator beacon, and controlling the target equipment to move to the target position;

S103. acquiring position information of the target equipment, and calculating a distance between the target equipment and the target position according to the target position and the position information of the target equipment; and S104. controlling the target equipment to stop moving when the distance between the target equipment and the target position is less than or equal to a set threshold.

In some embodiments, the step of determining target equipment, such as refrigerators, according to the number of connected terminals of a locator beacon comprises:

determining a target refrigerator according to the number of connected terminals of the locator beacon between each refrigerator and the target position.

In some embodiments, the step of determining the target refrigerator according to the number of connected terminals of the locator beacon between each refrigerator and the target position comprises:

obtaining the number of connected terminals of the locator beacon between each refrigerator and the target position by calculating $$E_m = \begin{cases} \sum_{i=1}^{n} S_i & \text{if } n > 0 \text{ and } i > 0 \\ 0 & \text{if } n = 0 \end{cases},$$

in which $E_m$ is the sum of the number of connected terminals of n locator beacons between an mth refrigerator and the target position; $S_i$ is the number of connected terminals of an ith locator beacon between the refrigerator and the target position; m is an integer greater than 1; and i and n are both non-negative integers, and $i \leqslant n$.

In some embodiments, the step of determining the target refrigerator according to the number of connected terminals of the locator beacon between each refrigerator and the target position comprises:

when the values of $E_m$ are not all the same, acquiring a minimum value $E_{mmin}$ of $E_m$, and judging whether the number of refrigerators corresponding to $E_{mmin}$ is greater than 1; when the number of refrigerators corresponding to $E_{mmin}$ is 1, taking the refrigerator corresponding to $E_{mmin}$ as the target refrigerator; when the number of refrigerators corresponding to $E_{mmin}$ is greater than 1, taking the refrigerator with the shortest distance from the target position among the refrigerators corresponding to $E_{mmin}$ as the target refrigerator;

optionally, when the number of refrigerators corresponding to $E_{mmin}$ is greater than 1, and the number of refrigerators with the shortest distance from the target position is also greater than 1, randomly selecting one of the refrigerators with the shortest distance from the target position as the target refrigerator; and when all the values of $E_m$ are the same, taking the refrigerator with the shortest distance from the target position as the target refrigerator; optionally, when all the values of $E_m$ are the same, and the number of refrigerators with the shortest distance from the target position is greater than 1, randomly selecting one of the refrigerators with the shortest distance from the target position as the target refrigerator.

In some embodiments, the locator beacon between each refrigerator and the target position is determined according to the coordinates and distances of each refrigerator and the target position.

In some embodiments, a line is made according to position coordinates of each refrigerator and the coordinates of the target position; a circular area is obtained by drawing a circle with a midpoint of the line as a center and a length from the midpoint to the target position as a radius; and then, the locator beacons inside the circular area are locator beacons between each refrigerator and the target position.

In some embodiments, the locator beacons are Bluetooth beacons.

In some embodiments, the target position and the position information of the refrigerator are obtained by calculating a locator beacon address and a received signal strength indication (RSSI) broadcasted by each locator beacon.

According to the control method for refrigerators in the above embodiments, it can be known that the control method for refrigerators provided by the embodiments of the present disclosure can determine the target refrigerator according to the number of connected terminals of the locator beacons and control the target refrigerator to move to the target position, thereby realizing the dispatching of refrigerators, so that the refrigerator can be moved to the target position to provide drinks, food or other services for the users at the target position; and meanwhile, multiple refrigerators can be dispatched simultaneously in large-scale scenes such as exhibition halls, thereby making the dispatching of refrigerators smarter and bringing more comfortable experience to the users.

In some embodiments, the control method for refrigerators in the above embodiments is suitable for large-scale scenes such as exhibitions and art exhibitions. Multiple locator beacons are pre-arranged in large-scale exhibition scenes. Optionally, the locator beacons are Bluetooth Beacons. Each terminal is connected with multiple Bluetooth Beacons. The coordinate information of the target position and the refrigerator is acquired according to Bluetooth Beacon addresses and the RSSI broadcasted by the Bluetooth Beacons when the Bluetooth Beacons receive the user instruction. A line is made according to position coordinates of each refrigerator and the coordinates of the target position; a circular area is obtained by drawing a circle with a midpoint of the line as a center and a length from the midpoint to the target position as a radius; and then, the Bluetooth Beacons inside the circular area are Bluetooth Beacons between each refrigerator and the target position. The target refrigerator is determined according to the number of connected terminals of the Bluetooth Beacons between each refrigerator and the target position, i.e., the target refrigerator is determined by the sum $E_m$ of the number of connected terminals of n Bluetooth Beacons between an mth refrigerator and the target position; whether the number of refrigerators corresponding to the minimum value $E_{mmin}$ of $E_m$ is greater than 1 is judged; when the number of refrigerators corresponding to $E_{mmin}$ is 1, the refrigerator corresponding to $E_{mmin}$ is taken as the target refrigerator; when the number of refrigerators corresponding to $E_{mmin}$ is greater than 1, the refrigerator with the shortest distance from the target position among the refrigerators corresponding to $E_{mmin}$ is taken as the target refrigerator; when the number of refrigerators corresponding to $E_{mmin}$ is greater than 1, and the number of refrigerators with the shortest distance from the target position is also greater than 1, one of the refrigerators with the shortest distance from the target position is randomly selected as the target refrigerator; then, the target refrigerator is controlled to move to the target position; and when the distance between the target refrigerator and the target position is less than or equal to the set threshold, the target refrigerator is controlled to stop moving, so that the target refrigerator can be moved to the target position in time according to the user instruction, thereby providing drinks, food or other services for the users at the target position, and multiple refrigerators can be dispatched according to the distance between each user and each refrigerator in large public places.

In some embodiments, the set threshold is 0.5 m.

In some embodiments, the target position is the position of the user. Certainly, the target position can also be a set coordinate value. Optionally, the position of the user is the position of a user terminal issuing the user instruction.

In some embodiments, the terminal is a smart phone or a smart watch.

In some embodiments, the refrigerators are powered by storage batteries.

In some embodiments, each refrigerator is provided with driving wheels and a driving motor, which enable the refrigerator move on the plane. Cameras are further arranged at a front end and a side surface of each refrigerator, to acquire road information in real time by collecting and recognizing patterns. In case of obstacles such as steps, a controller will control the refrigerator to turn or stop running, thereby preventing collision or falling. Meanwhile, a radar ultrasonic sensor is also provided for detecting a distance between the refrigerator and each of the surrounding objects when moving. Photoelectric coding disks are arranged on the running driving wheels of each refrigerator, for detecting and controlling a wheel speed and realizing positioning and path planning.

Figure 2:
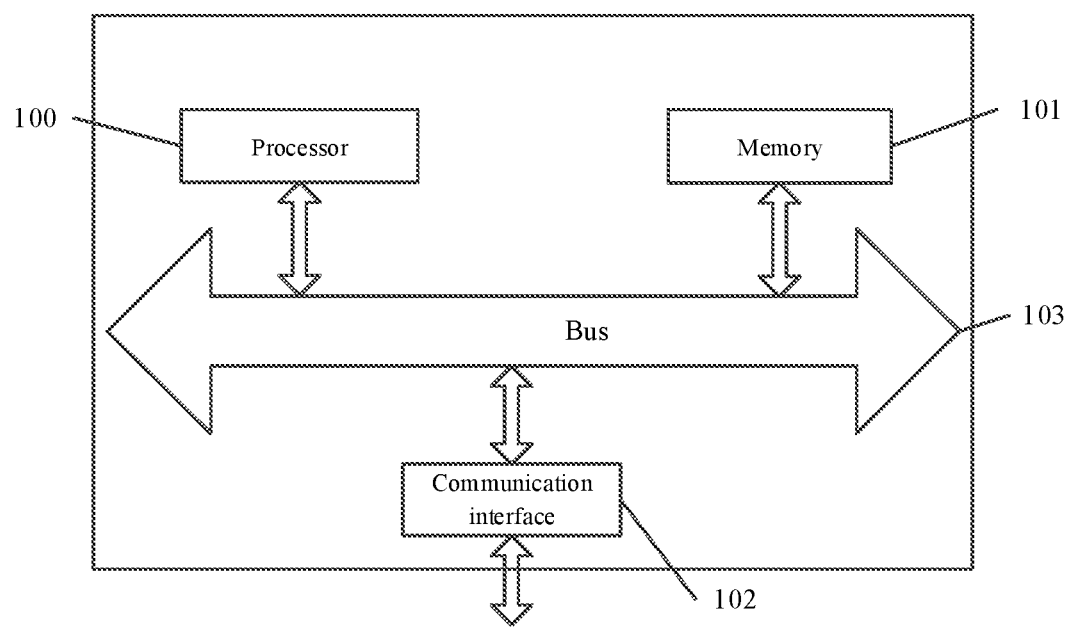
FIG. 2 is a schematic diagram of a control device for a refrigerator provided by embodiments of the present disclosure.

The embodiments of the present disclosure provide a control device for refrigerators. The control device has a structure as shown in FIG. 2, comprises a processor 100 and a memory 101 storing program instructions, and may further comprise a communication Interface 102 and a bus 103. The processor 100, the communication interface 102, and the memory 101 can communicate with one another through the bus 103. The communication interface 102 can be used for information transmission. The processor 100 can be used for calling the program instructions in the memory 101. The processor is configured to execute the control method for refrigerators provided by the above embodiments when executing the program instructions.

In addition, logical instructions in the memory 101 can be implemented in the form of software function units, and can be stored in a computer-readable storage medium when the logical instructions are sold or used as independent products.

As a computer-readable storage medium, the memory 101 can be used for storing software programs and computer-executable programs, such as the program instruction/module corresponding to the method in the embodiment of the present disclosure. The processor 100 executes function application and data processing by executing software programs, instructions and modules stored in the memory 101, i.e., implements the control method for refrigerators in the above method embodiments.

The memory 101 may comprise a memory program area and a memory data area, in which the memory program area may store application programs required by an operating system and at least one function; and the memory data area may store data created according to the use of a mobile terminal and the like. In addition, the memory 101 may comprise a high-speed random access memory (RAM), and may further comprise a nonvolatile memory.

According to the control device for refrigerators in the above embodiments, it can be known that the control device for refrigerators provided by the embodiments of the present disclosure can determine the target refrigerator according to the number of connected terminals of the locator beacons and control the target refrigerator to move to the target position, thereby realizing the dispatching of refrigerators, so that the refrigerator can be moved to the target position to provide drinks, food or other services for the users at the target position; and meanwhile, multiple refrigerators can be dispatched simultaneously in large-scale scenes such as exhibition halls, thereby making the dispatching of refrigerators smarter and bringing more comfortable experience to the users.

The embodiments of the present disclosure provide a refrigerator, which comprises the control device for refrigerators. The refrigerator can determine the target refrigerator according to the number of connected terminals of the locator beacons and control the target refrigerator to move to the target position, thereby realizing the dispatching of refrigerators, so that the refrigerator can be moved to the target position to provide drinks, food or other services for the users at the target position; and meanwhile, multiple refrigerators can be dispatched simultaneously in large-scale scenes such as exhibition halls, thereby making the dispatching of refrigerators smarter and bringing more comfortable experience to the users.

The embodiments of the present disclosure provide a computer-readable storage medium storing computer-executable instructions, which are configured to execute the above control method for refrigerators.

The embodiments of the present disclosure provide a computer program product, comprising computer programs stored on a computer-readable storage medium. The computer programs comprise program instructions. When the program instructions are executed by a computer, the computer executes the above control method for refrigerators.

The computer-readable storage medium may be a transient computer-readable storage medium or a non-transient computer-readable storage medium.

Technical solutions of the embodiments of the present disclosure can be reflected in the form of software product. The computer software product is stored in a memory medium, and comprises one or more instructions for making computer equipment (which may be a personal computer, a server, network equipment, or the like) execute all or part of the steps of the method provided by the embodiments of the present disclosure. The foregoing memory medium may be a non-transient memory medium, comprising a USB flash drive, a mobile hard disk, a read-only memory (ROM), a random access memory (RAM), a diskette, a compact disk (CD) and the like, and may also be a transient memory medium.

The above descriptions and accompanying drawings fully illustrate the embodiments of the present disclosure, so that those skilled in the art can practice them. Other embodiments may comprise structural, logical, electrical, procedural, and other changes. The embodiments only represent possible variations. Unless explicitly required, individual components and functions are optional; and the order of operations is variable. Parts and features of some embodiments may be contained in or substituted with parts and features of other embodiments. The scope of the embodiments of the present disclosure comprises the entire scope of claims, and all available equivalents of the claims. The terms "first", "second" and the like may be used in the present application to describe various components, but the components should not be limited by the terms. The terms are merely used to distinguish one component from another. For example, the first component can be called the second component without changing the meaning of the description. Similarly, the second component can be called the first component as long as all present "first components" are renamed uniformly while all present "second components" are renamed uniformly. The first component and the second component are both components, but may not be the same component. In addition, the words used in the present application are merely used to describe the embodiments, rather than limit the claims. As used in the descriptions of the embodiments and the claims, unless the context clearly indicates, the singular forms "a", "an" and "the" are intended to comprise the plural forms as well. Similarly, the term "and/or" as used in the present application is meant to comprise any and all possible combinations of one or more associated listings. Furthermore, when used in the present application, the term "comprise" and its variants "comprise" and/or "comprising" and the like refer to the existence of stated features, integers, steps, operations, elements, and/or components, but do not exclude the existence or addition of one or more other features, integers, steps, operations, elements, components, and/or groups of them. Without further restrictions, the element defined by the statement "comprising one . . . " does not exclude the existence of other identical elements in the process, method or equipment comprising the element. Each embodiment herein may focus on the differences from other embodiments, while the identical or similar parts of the various embodiments can be referred to each other. If the methods, the products and the like disclosed in the embodiments correspond to the method parts disclosed in the embodiments, the related parts can be referred to the description of the method parts.

Those skilled in the art can recognize that units and algorithm steps of each example described in combination with the embodiments disclosed herein can be implemented by electronic hardware or a combination of computer software and the electronic hardware. Whether the functions are implemented by hardware or software may depend on the specific application and design constraints of the technical solution. The technical personnel can implement the described functions by using different methods for each specific application, but such implementation should not be considered beyond the scope of the embodiments of the present disclosure. The technical personnel can clearly understand that, for the convenience and conciseness of description, the specific working processes of the systems, the devices and the units described above can refer to the corresponding processes in the foregoing method embodiments, and will not be repeated here.

In the embodiments disclosed herein, the disclosed methods and products (comprising but not limited to the devices, the equipment and the like) can be implemented in other ways. For example, the device embodiments described above are merely schematic. For example, the division of units may only be a logical function division, and may adopt another division ways in actual implementation, for example, multiple units or components can be combined or integrated into another system, or some features can be ignored or not implemented. In addition, the shown or discussed mutual coupling, direct coupling or communication connection may be indirect coupling or communication connection through some interfaces, devices or units or in electrical, mechanical or other forms. The units described as separate components may or may not be physically separated; and the components displayed as units may or may not be physical units, i.e., may be located at one place or distributed to multiple network units. Some or all of the units can be selected according to actual needs to implement the present embodiment. Furthermore, each functional unit in the embodiments of the present disclosure may be integrated into one processing unit; alternatively, each unit may physically exist separately; and alternatively, two or more units may be integrated into one unit.

The flowchart and the block diagram in the accompanying drawings show achievable architectures, functions and operations of the systems, the methods and the computer program products according to the embodiments of the present disclosure. In this regard, each block in the flowchart or the block diagram may represent a part of a module, a program segment or a code; and the part of the module, the program segment or the code comprises one or more executable instructions for implementing specified logical functions. In some alternative implementations, the functions noted in the blocks may also be implemented in a sequence different from that noted in the accompanying drawings. For example, two consecutive blocks can actually be executed substantially in parallel, and sometimes can be executed in a reverse sequence, depending on the functions involved. In the descriptions corresponding to the flowchart and the block diagram in the accompanying drawings, the operations or steps corresponding to different blocks may also be implemented in a sequence different from that disclosed in the descriptions; and sometimes, no specific sequence exists between different operations or steps. For example, two consecutive operations or steps can actually be executed substantially in parallel, and sometimes can be executed in a reverse sequence, depending on the functions involved. Each block in the block diagram and/or flowchart, and combinations of blocks in the block diagram and/or flowchart may be implemented by hardware-based systems special for performing specified functions or actions, or may be implemented by a combination of special hardware and computer instructions.

What is claimed is:

1. A control method for equipment, comprising the steps of:
    acquiring a user instruction and a target position;
    acquiring the number of connected terminals of each locator beacon;
    determining target equipment obtaining the number of connected terminals of the locator beacon between each equipment and the target position by calculating $$E_m = \begin{cases} \sum_{i=1}^{n} S_i & \text{if } n > 0 \text{ and } i > 0 \\ 0 & \text{if } n = 0 \end{cases},$$

wherein $E_m$ is the sum of the number of connected terminals of n locator beacons between mth equipment and the target position; $S_i$ is the number of connected terminals of an ith locator beacon between the equipment and the target position; m is an integer greater than 1; and i and n are both non-negative integers, and i≤n;
    controlling the target equipment to move to the target position;
    acquiring position information of the target equipment, and calculating a distance between the target equipment and the target position according to the target position and the position information of the target equipment; and
    controlling the target equipment to stop moving when the distance between the target equipment and the target position is less than or equal to a set threshold.

2. The method according to claim 1, wherein the step of determining the target equipment according to the number of connected terminals of the locator beacon between each equipment and the target position comprises:
    when the values of $E_m$ are not all the same, acquiring a minimum value $E_{mmin}$ of $E_m$, and judging whether the number of equipment corresponding to $E_{mmin}$ is greater than 1; when the number of equipment corresponding to $E_{mmin}$ is 1, taking the equipment corresponding to $E_{mmin}$ as the target equipment; when the number of equipment corresponding to $E_{mmin}$ is greater than 1, taking the equipment with the shortest distance from the target position among the equipment corresponding to $E_{mmin}$ as the target equipment; and when all the values of $E_m$ are the same, taking the equipment with the shortest distance from the target position as the target refrigerator.

3. The method according to claim 2, wherein the locator beacon between each equipment and the target position is determined according to the coordinates and distances of each equipment and the target position.

4. The method according to claim 3, wherein a line is made according to position coordinates of each equipment and the coordinates of the target position; a circular area is obtained by drawing a circle with a midpoint of the line as a center and a length from the midpoint to the target position as a radius; and then, the locator beacons inside the circular area are locator beacons between each equipment and the target position;
wherein the locator beacons are Bluetooth beacons;
wherein the target position and the position information of the equipment are obtained by calculating a locator beacon address and a received signal strength indication (RSSI) broadcasted by each locator beacon.

5. The method according to claim 1, wherein the locator beacon between each equipment and the target position is determined according to the coordinates and distances of each equipment and the target position.

6. The method according to claim 5, wherein a line is made according to position coordinates of each equipment and the coordinates of the target position; a circular area is obtained by drawing a circle with a midpoint of the line as a center and a length from the midpoint to the target position as a radius; and then, the locator beacons inside the circular area are locator beacons between each equipment and the target position.

7. The method according to claim 6, wherein the locator beacons are Bluetooth beacons.

8. The method according to claim 7, wherein the target position and the position information of the equipment are obtained by calculating a locator beacon address and a received signal strength indication (RSSI) broadcasted by each locator beacon.

9. A control device for equipment, comprising a memory storing program instructions, and a processor configured to execute the program instructions, wherein upon execution of the program instruction, the processor causes the control device to perform operations including:
acquiring a user instruction and a target position;
acquiring the number of connected terminals of each locator beacon;
determining target equipment by obtaining the number of connected terminals of the locator beacon between each equipment and the target position by calculating $$E_m = \begin{cases} \sum_{i=1}^{n} S_i & \text{if } n > 0 \text{ and } i > 0 \\ 0 & \text{if } n = 0 \end{cases},$$

wherein $E_m$ is the sum of the number of connected terminals of n locator beacons between mth equipment and the target position; $S_i$ is the number of connected terminals of an ith locator beacon between the equipment and the target position; m is an integer greater than 1; and i and n are both non-negative integers, and i≤n;
controlling the target equipment to move to the target position;
acquiring position information of the target equipment, and calculating a distance between the target equipment and the target position according to the target position and the position information of the target equipment; and
controlling the target equipment to stop moving when the distance between the target equipment and the target position is less than or equal to a set threshold.

10. The control device for equipment according to claim 9, wherein the step of determining the target equipment according to the number of connected terminals of the locator beacon between each equipment and the target position comprises:
when the values of $E_m$ are not all the same, acquiring a minimum value $E_{mmin}$ of $E_m$, and judging whether the number of equipment corresponding to $E_{mmin}$ is greater than 1; when the number of equipment corresponding to $E_{mmin}$ is 1, taking the equipment corresponding to $E_{mmin}$ as the target equipment; when the number of equipment corresponding to $E_{mmin}$ is greater than 1, taking the equipment with the shortest distance from the target position among the equipment corresponding to $E_{mmin}$ as the target equipment; and
when all the values of $E_m$ are the same, taking the equipment with the shortest distance from the target position as the target refrigerator.

11. The control device for equipment according to claim 10, wherein the locator beacon between each equipment and the target position is determined according to the coordinates and distances of each equipment and the target position.

12. The control device for equipment according to claim 11, wherein a line is made according to position coordinates of each equipment and the coordinates of the target position; a circular area is obtained by drawing a circle with a midpoint of the line as a center and a length from the midpoint to the target position as a radius; and then, the locator beacons inside the circular area are locator beacons between each equipment and the target position;
wherein the locator beacons are Bluetooth beacons;
wherein the target position and the position information of the equipment are obtained by calculating a locator beacon address and a received signal strength indication (RSSI) broadcasted by each locator beacon.

13. The control device for equipment according to claim 9, wherein the locator beacon between each equipment and the target position is determined according to the coordinates and distances of each equipment and the target position.

14. The control device for equipment according to claim 13, wherein a line is made according to position coordinates of each equipment and the coordinates of the target position; a circular area is obtained by drawing a circle with a midpoint of the line as a center and a length from the midpoint to the target position as a radius; and then, the locator beacons inside the circular area are locator beacons between each equipment and the target position.

15. The control device for equipment according to claim 14, wherein the locator beacons are Bluetooth beacons.

16. The control device for equipment according to claim 15, wherein the target position and the position information of the equipment are obtained by calculating a locator beacon address and a received signal strength indication (RSSI) broadcasted by each locator beacon.

17. A refrigerator, comprising:
a control device for equipment, wherein the control device includes a memory storing program instructions, and a processor configured to execute the program instructions, wherein upon execution of the program instruction, the processor causes the control device to perform operations including:
acquiring a user instruction and a target position;
acquiring the number of connected terminals of each locator beacon;
determining target equipment by obtaining the number of connected terminals of the locator beacon between each equipment and the target position by calculating $$E_m = \begin{cases} \sum_{i=1}^{n} S_i & \text{if } n > 0 \text{ and } i > 0 \\ 0 & \text{if } n = 0 \end{cases},$$

wherein $E_m$ is the sum of the number of connected terminals of n locator beacons between mth equipment and the target position; $S_i$ is the number of connected terminals of an ith locator beacon between the equipment and the target position; m is an integer greater than 1; and i and n are both non-negative integers, and i≤n;
controlling the target equipment to move to the target position;
acquiring position information of the target equipment, and calculating a distance between the target equipment and the target position according to the target position and the position information of the target equipment; and
controlling the target equipment to stop moving when the distance between the target equipment and the target position is less than or equal to a set threshold.

18. The refrigerator according to claim 17, wherein the step of determining the target equipment according to the number of connected terminals of the locator beacon between each equipment and the target position comprises:
when the values of $E_m$ are not all the same, acquiring a minimum value $E_{mmin}$ of $E_m$, and judging whether the number of equipment corresponding to $E_{mmin}$ is greater than 1; when the number of equipment corresponding to $E_{mmin}$ is 1, taking the equipment corresponding to $E_{mmin}$ as the target equipment; when the number of equipment corresponding to $E_{mmin}$ is greater than 1, taking the equipment with the shortest distance from the target position among the equipment corresponding to $E_{mmin}$ as the target equipment; and
when all the values of $E_m$ are the same, taking the equipment with the shortest distance from the target position as the target refrigerator.

19. The refrigerator according to claim 17, wherein the locator beacon between each equipment and the target position is determined according to the coordinates and distances of each equipment and the target position.

20. The refrigerator according to claim 19, wherein a line is made according to position coordinates of each equipment and the coordinates of the target position; a circular area is obtained by drawing a circle with a midpoint of the line as a center and a length from the midpoint to the target position as a radius; and then, the locator beacons inside the circular area are locator beacons between each equipment and the target position.

* * * * *